US00RE45875E

(19) United States
(12) Reissued Patent
Wang

(10) Patent Number: US RE45,875 E
(45) Date of Reissued Patent: Feb. 2, 2016

(54) METHOD OF PRODUCING A LOW TWIST TOWEL

(71) Applicant: Loftex USA LLC, New York, NY (US)

(72) Inventor: Hongxing Wang, Shandong (CN)

(73) Assignee: LOFTEX USA LLC, New York, NY (US)

(21) Appl. No.: 14/524,426

(22) Filed: Oct. 27, 2014

Related U.S. Patent Documents

Reissue of:
(64) Patent No.: 7,810,308
Issued: Oct. 12, 2010
Appl. No.: 12/237,147
Filed: Sep. 24, 2008

U.S. Applications:
(62) Division of application No. 13/647,661, filed on Oct. 9, 2012, now Pat. No. Re. 45,243, which is an application for the reissue of Pat. No. 7,810,308.

(30) Foreign Application Priority Data

Sep. 25, 2007 (CN) ..... 2007 1 0017170

(51) Int. Cl.

| | |
|---|---|
| ***D01H 7/02*** | (2006.01) |
| ***A23B 4/08*** | (2006.01) |
| ***A23L 1/318*** | (2006.01) |
| ***D01H 1/11*** | (2006.01) |
| ***D01H 7/00*** | (2006.01) |
| ***D03D 1/00*** | (2006.01) |
| ***D03D 15/00*** | (2006.01) |
| ***D03D 23/00*** | (2006.01) |
| ***D03D 27/00*** | (2006.01) |
| ***D06B 3/10*** | (2006.01) |
| ***D02G 3/28*** | (2006.01) |

(52) U.S. Cl.
CPC ..... *A23B 4/08* (2013.01); *A23L 1/3182* (2013.01); *D01H 1/11* (2013.01); *D01H 7/00* (2013.01); *D01H 7/02* (2013.01); *D02G 3/28* (2013.01); *D03D 1/0017* (2013.01); *D03D 15/00* (2013.01); *D03D 15/0094* (2013.01); *D03D 23/00* (2013.01); *D03D 27/00* (2013.01); *D06B 3/10* (2013.01)

(58) Field of Classification Search
CPC ..... D01H 1/11; D01H 7/00; D01H 7/02; D03D 1/0017; D03D 15/00; D03D 15/0094; D03D 23/00; D03D 27/00; D06B 3/10; D02G 3/28; D06M 11/38; D06M 11/40; D06P 1/67333; D06P 1/6735; D10B 2201/02; D10B 2401/062; D10B 2401/14; D10B 2509/026
USPC ..... 57/204, 282, 283, 293, 362; 28/210; 139/35, 116.1
See application file for complete search history.

(56) References Cited

U.S. PATENT DOCUMENTS

| | | | | |
|---|---|---|---|---|
| 3,150,918 | A | 9/1964 | Currier | |
| 3,169,557 | A * | 2/1965 | Holland et al. | 139/383 R |
| 6,051,034 | A | 4/2000 | Caldwell | |
| 2004/0131821 | A1* | 7/2004 | Mandawewala | 428/97 |
| 2005/0204719 | A1* | 9/2005 | Ono et al. | 57/293 |
| 2007/0087162 | A1 | 4/2007 | Mandawewalam | |
| 2007/0104948 | A1* | 5/2007 | Kiriyama et al. | 428/364 |

FOREIGN PATENT DOCUMENTS

| | | | |
|---|---|---|---|
| CN | 1038847 | A | 1/1990 |
| CN | 1122393 | | 5/1996 |
| CN | 2337162 | Y | 9/1999 |
| CN | 1336454 | A | 2/2002 |
| CN | 1472379 | A | 2/2004 |
| JP | 8-13283 | | 1/1996 |
| JP | 2005-42281 | A | 2/2005 |
| WO | WO 2004/037027 | * | 5/2004 |

OTHER PUBLICATIONS

"Developing a Twistless Towel" publication date: Jun. 30, 1984.*
"Defendant Trident Limited's Opening Claim Construction Brief", filed Sep. 24, 2012, Case 1:11-cv-09349-PAE; Document #24, pp. 1-35.
"Plaintiff Loftex USA LLC's Opening Claim Construction Brief", filed Sep. 24, 2012, Case 1:11-cv-09349-PAE; Document #26, pp. 1-25.
"Defendant Trident Limited's Opposition to Plaintiff Loftex USA LLC's Opening Claim Construction Brief", filed Oct. 22, 2012, Case 1:11-cv-09349-PAE; Document #28, pp. 1-21.
"Plaintiff Loftex USA LLC's Opposition to Defendant Trident Limited's Opening Claim Construction Brief", filed Oct. 22, 2012, Case 1:11-cv-09349-PAE; Document #29, pp. 1-16.
"Opinion and Order", filed May 15, 2013, Case 1:11-cv-09349-PAE; Document #43, pp. 1-21.

* cited by examiner

*Primary Examiner* — Norca L Torres Velazquez
(74) *Attorney, Agent, or Firm* — Leason Ellis LLP

(57) ABSTRACT

The invention relates to a method for producing a towel, specifically a low twist towel, comprising the following steps: Z twisting a thick yarn and separately Z twisting a fine count yarn; unevenly S twisting the Z-twisted yarns to make the volume of the thick yarn more than that of the fine count; weaving the yarn to produce a fabric; processing the fabric with hot water to reduce inner tension in the yarn and make the fabric become fluffy. Fabric produced by this method can solve the dependency on PVA, reduce energy consumption and material consumption, and prevent water pollution. This method for producing a low twist towel is environmentally friendly, healthy, and energy saving.

24 Claims, No Drawings

METHOD OF PRODUCING A LOW TWIST TOWEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

[This application] *More than one reissue application has been filed for the reissue of U.S. Pat. No. 7,810,308. The present application is a divisional reissue application of U.S. Reissue patent application Ser. No. 13/647,661, filed Oct. 9, 2012, which is an application for reissue of U.S. Pat. No. 7,810,308, which* claims the benefit of priority to Chinese Patent Application No. CN200710017170 filed Sep. 25, 2007, the disclosure of [which] *each* is hereby incorporated by reference in its entirety.

FIELD OF THE INVENTION

The present invention relates to the production of a low twist towel suitable for daily use.

BACKGROUND

A low twist towel is classified as a high end product in the U.S. market. It is fluffy, soft, and super absorbent. The traditional procedure for producing such towels involves twisting a Polyvinyl Alcohol yarn (PVA fiber) in the opposite direction of a cotton yarn so that the resulting 2-ply yarn has a stronger tension in weaving. In woven fabric, the PVA fiber will dissolve in hot water at 85-90° C. In this manner, the twist of the yarn left behind after the PVA dissolves is very low, resulting in a low twist towel. However, this process consumes a large amount of PVA fiber (and is therefore not cost efficient), and the PVA fiber released into the water causes pollution and makes extra work for water processing plants.

SUMMARY OF THE INVENTION

The present invention relates to a method of producing a low twist towel, comprising the steps of: (a) Z twisting a thick yarn and separately Z twisting a fine count yarn; (b) unevenly S twisting the Z-twisted thick yarn into the Z-twisted fine count yarn, such that the volume of thick yarn is higher than the volume of fine count yarn, to produce a 2-ply yarn; (c) weaving the 2-ply yarn to produce a fabric that is free of polyvinyl alcohol fibers; (d) contacting the fabric with hot water to reduce the inner tension of the yarn; and (e) producing a low twist towel.

In one embodiment, the thick yarn is a 16s-2s count yarn, preferably 12s. In one embodiment, the fine count yarn is a greater than or equal to 60s count yarn, preferably 60s. The thick yarn and the fine count yarn may be cotton yarns. The weight ratio of thick yarn to fine count yarn in step (a) may be from about 3.5:1 to about 12:1, preferably 12:1. The volume ratio of thick yarn to fine count yarn in step (b) may be from about 1.1:1 to about 1.3:1, preferably 1.2:1. In one embodiment, step (d) comprises contacting the fabric for about 20-60 minutes with hot water having a temperature of about 80-95° C., preferably 60 minutes with hot water having a temperature of 85-92° C. In another embodiment, one or more of bleaching, dyeing, and final finishing may be performed after step (d). For example, a bleaching step may comprise contacting the fabric with a solution comprising NaOH and a fine finishing agent. For example, a final finishing step may comprise contacting the fabric with a solution comprising a hydrophilic softener, such as SN-308 crodamide ramification, 2.5-3.8% OWF or cellulose, 0.8-1% OWF.

The present invention also includes a high quality low twist towel made by the process of the present invention, including a towel having a lint ratio of about 0.08 to about 0.12%.

DETAILED DESCRIPTION

The present invention provides a new procedure that avoids the technical defects, waste, and environmental problems associated with traditional low twist towel production. In particular, the present invention does not use PVA fiber in its process of making a low twist towel, which thus decreases production costs, avoids water pollution, and helps protect and improve the environment.

A key feature of the unique process of the present invention is the spinning and twisting of the yarns, which ultimately produces a surprisingly high quality towel, especially in terms of hand feel, fluffiness, absorbency, bulky appearance, laundry performance, and ease of weaving. The process of the present invention includes the following steps:

(a) Yarn-spinning: Z twist a thick yarn (i.e., twist the yarn clockwise, in a similar direction as the letter "Z"), and separately Z twist a fine count yarn.

(b) Twisting Plied Yarns: unevenly S twist the two yarns together (i.e., twist the yarns counterclockwise, in a similar direction as the letter "S") to form a 2-ply yarn. An S twisted 2-ply yarn has, for example, a twist of 24-30T/10 cm. The volume of thick yarn should be higher than the volume of fine count yarn.

(c) Weaving: weaving is defined as the interlacing of yarns to form a fabric, and is suitably performed using conventional techniques known in the art. For example, weaving may be performed as follows: warp the yarn, perform sizing (to make the thread stiff to allow for weaving and starching of the warped threads), put the beams onto a rapier loom machines, and use an air jet to push the filling thread across the loom. The loom carries the weft by using two rapiers, a giver and a taker. The giver takes the weft from one side of the loom to halfway and passes it to the taker, then the reverse procedure happens, and so on. The weft is carried across on a jet of air. After weaving, the greige goods go into the overflow dyeing machine for hot water processing.

(d) Hot Water Processing: this procedure is suitably performed using conventional techniques known in the art. Preferably, the fine count yarn is twisted so that the thick yarn twisted with it is de-twisted to achieve the fabric's fluffy feature. The yarns do not need to be submerged in hot water. For example, hot water processing may be performed as follows: use a volume of water of 150-900 kg having a dyeing stuff ratio of 1:10 to 1:13 (dyeing stuff ratio refers to the ratio of fabric to the water and dye solution). Raise the temperature to 80-90° C., process for 30-50 minutes, set the pH to 6.5-7.2 and the rigidity to <120 ppm. After the overflow machine, the goods (i.e., the fabrics) are spun to shale off extra water; the goods are still damp.

Suitable fine count yarns include, for example, greater than or equal to about 60s (preferably, 60s) count yarns (e.g., chiffonelle), yarns having a strength of about 165-180 CN, and yarns having a twist value of about 120-132 T/10 cm. An exemplary fine count yarn is count 60s, having a strength of 165-180 CN and a twist of 120-132T/10 cm. Suitable thick yarns include, for example, about 16s-2s count (preferably, 10s or 12s count) yarns, yarns having a strength of about 580-640 CN, and yarns having a twist value of about 40-50 T/10 cm. An exemplary thick yarn is count 12s, having a strength of 580-640 CN and a twist of 45-50T/10 cm. In one embodiment of the yarn spinning step, 12s cotton yarn is Z twisted as 60s fine count yarn is Z twisted. In another embodiment of the yarn spinning step, the weight ratio of thick yarn to fine count yarn is from about 3.5:1 to about 12:1, preferably about 12:1 or in the range of about 3.75:1 to about 5:1.

In one embodiment of the twisting step, the volume ratio of thick yarn to fine count yarn is from about 1.1:1 to about 1.3:1. This ratio reflects the ratio of twisting the thick yarn into the finer yarn to create the 2-ply.

In one embodiment of the weaving step, the following parameters may be used: towel tensile: about 30-50 kg; ground tensile: about 280-320 kg; frame: about 274-278 mm pile, about 276-280 mm ground; angle: about 300-320. Other suitable weaving parameters are known in the art and used in conventional processes.

In one embodiment of the hot water processing step, the temperature of the water is maintained at about 80-95° C., preferably 85-92° C., for about 20-60 minutes, preferably 30-50 minutes. It is preferable to add 3-10 g/L penetrant (e.g., Penetrant T, JFC available from Yingdi Chemical Co., Ltd., Shanghai, P. R. China) to the water. The hot water processing may be performed using, for example, a Fong's overflow dyeing machine (volume 150-900 kg, dyeing stuff ratio of 1:10 to 1:13). In one embodiment, the pH during hot water processing is adjusted to 6.5-7.2, and rigidity is set at less than 120 ppm. Hot water processing increases the twist of the fine yarn and decreases the twist of the thick yarn to produce the low twist appearance of the fabric.

Additional steps may be performed after the hot water processing using conventional techniques for low twist processing known in the art. For instance, bleaching, dyeing, and final finishing procedures may be performed at this stage in the process. In one embodiment, bleaching is performed by contacting the fabric with a solution comprising about 5-15 g/L NaOH liquid and about 1-4 g/L reduced-alkali accelerant (e.g., 99.5% citric acid, 80% glacial acetic acid, or other chemicals that can counteract the NaOH). Bleaching may be followed by use of a hydrophilic softener for final finishing. Another example of a bleaching solution suitable for use in the present invention comprises: 35% oxydol (4-6 g/L), 30% NaOH (4-6 g/L), stabilizer (0.8-1.5 g/L), and fine finishing agent (0.8-1.5 g/L). In one embodiment, bleaching is conducted for 50 minutes at 98° C. and at a pH of 11-12. The NaOH is used to remove oil, wax, and gel present in cotton fiber; sodium carbonate may also be used for this purpose.

In one embodiment, dyeing is performed by contacting the fabric with a solution comprising water, dyeing stuff, and dyeing chemicals; adjusting the pH to about 10; heating at about 60° C. for about 30 minutes; and then releasing water from the fabric. An example of a dyeing solution suitable for use in the present invention comprises: 99% salt (20-50 g/L) and 99.5% sodium carbonate (5-15 g/L). Preferably, dyeing is performed after bleaching. Dye stuff refers to the actual color, and dye chemicals refer to chemicals (e.g., salt and sodium carbonate) that aid in color absorption.

In one embodiment, final finishing is performed by contacting the fabric with a solution containing SN-308 crodamide ramification, 2.5-3.8% OWF. Another suitable finishing solution is cellulose, 0.8-1% OWE. Final finishing is important as it produces a better look, better feel, and improved softening in the final towel product.

The environmentally friendly procedure of the present invention eliminates the dependence on PVA fiber in low twist towel production, reduces energy and material consumption, and avoids water pollution. Towels produced using the process of the present invention have the following advantageous features:

1. fluffy, bulky appearance;
2. great absorbency; and
3. good laundry performance, including a lint ratio of about 0.08 to about 0.12%, compared with 0.5 to 0.8% of conventional low twist products.

AATCC135, fibers that fall from a towel body during laundry, are an example of "lint." Lint ratio refers to a ratio of the weight of dry lint to the weight of dry towel. A lint ratio may be measured by washing and drying a towel according to the care label and then gathering the produced lint for weight testing.

EXAMPLES

The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the appended claims, along with the full scope of equivalents to which the claims are entitled.

Example 1

This example includes twisting thick and fine yarns in opposite directions, weaving, hot water processing, bleaching, dyeing, finishing, sewing, etc. Specifically, the following steps were performed:

(a) Yarn-spinning: Z twisting 16s cotton yarn and Z twisting 60s cotton yarn; weight ratio was set to 3.5:1.

(b) Twisting plied yarns: unevenly S twisting the Z-twisted thick yarn into the Z-twisted fine count yarn at a volume ratio of 1.1:1. In this case, the fine count yarn de-twisted the thick yarn.

(c) Weaving: weaving the yarn to produce a fabric using conventional techniques known in the art.

(d) Hot Water Processing: the fabric was wetted with hot water set at 85-92° C. for 30-50 minutes to reduce the inner tension of the yarn.

(e) Bleaching and Dyeing: the fabric was contacted with a solution containing 5 g/L NaOH liquid and 0.8-1.5 g/L Fine Finishing agent at 98° C. for 50 minutes.

(f) Final finishing: the fabric was contacted with a solution containing a hydrophilic softener.

Result: the towel produced in Example 1 was easy to weave, but was an unsatisfactory product due to its unsatisfactory hand feel.

Example 2

(a) Yarn-spinning: Z twisting 12s cotton yarn and Z twisting 60s cotton yarn; weight ratio was set to 12:1.

(b) Twisting plied yarns: unevenly S twisting the Z-twisted thick yarn into the Z-twisted fine count yarn at a volume ratio of 1.2:1. In this case, the fine count yarn de-twisted the thick yarn.

(c) Weaving: weaving the yarn to produce a fabric using conventional techniques known in the art.

(d) Hot Water Processing: 3-10 g/L penetrant was added to water, and the fabric was wetted with the water heated at a temperature of 85-92° C. for 20 minutes to reduce the inner tension of the yarn.

(e) Bleaching and Dyeing: the fabric was contacted with a solution containing 10 g/L NaOH liquid and 2 g/L Fine Finishing agent at 98° C. for 50 minutes.

(f) Final finishing: the fabric was contacted with a solution containing a hydrophilic softener.

Result: the towel produced in Example 2 had good hand feel and loop style, but was an unsatisfactory product due to weaving limitations and low efficiency.

Example 3

(a) Yarn-spinning: Z twisting 10s cotton yarn and Z twisting 60s cotton yarn; weight ratio was set to 8:1.

(b) Twisting plied yarns: unevenly S twisting the Z-twisted thick yarn into the Z-twisted fine count yarn at a volume ratio of 1.3:1. In this case, the fine count yarn de-twisted the thick yarn.

(c) Weaving: weaving the yarn to produce a fabric using conventional techniques known in the art.

(d) Hot Water Processing: 3-10 g/L penetrant was added to water, and the fabric was wetted with the water heated at a temperature of 85-92° C. for 30-50 minutes to reduce the inner tension of the yarn.

(e) Bleaching and Dyeing: the fabric was contacted with a solution containing 15 g/L NaOH liquid and 4 g/L Fine Finishing agent at 98° C. for 50 minutes.

(f) Final finishing: the fabric was contacted with a solution containing a hydrophilic softener.

Result: the towel produced in Example 3 had good hand feel, was fluffy, had good absorbency, and was easy to weave.

Example 4

(a) Yarn-spinning: Z twisting 12s cotton yarn while Z twisting 60s cotton yarn; weight ratio was set to 12:1. Thick Yarn Count 12s: Strength 580-640 CN, Twist 45-50T/10 cm in a Z twist. Fine Yarn Count 60s: Strength 165-180 CN, Twist 120-132T/10 cm in a Z Twist.

(b) Twisting plied yarns: unevenly S twisting the Z-twisted thick yarn into the Z-twisted fine count yarn at a volume ratio of 1.2:1. Twist=24-30T/10 cm. In this case, the fine count yarn de-twisted the thick yarn.

(c) Weaving: weaving the yarn to produce a fabric using conventional techniques known in the art.

(d) Hot Water Processing: 3-10 g/L penetrant was added to water, and the fabric was wetted with the water heated at a temperature of 85-92° C. for 60 minutes to reduce the inner tension of the yarn.

(e) Bleaching and Dyeing: the fabric was contacted with a solution containing 8 g/L NaOH liquid and 3 g/L Fine Finishing agent at 98° C. for 50 minutes.

(f) Final finishing: the fabric was contacted with a solution containing a hydrophilic softener—i.e., crodamide ramification, 2.5-3.8% OWF.

Result: the towel produced in Example 4 was surprisingly superior to the towels produced in Examples 1-3. Of these examples, the Example 4 towel had the best overall quality in terms of hand feel, fluffiness, absorbency, and ease of weaving.

All references cited and/or discussed in this specification are incorporated herein by reference in their entirety and to the same extent as if each reference was individually incorporated by reference.

I claim:

[1. A method of producing a low twist towel, comprising the steps of:

(a) Z twisting a thick yarn and separately Z twisting a fine count yarn;

(b) unevenly S twisting the Z-twisted thick yarn into the Z-twisted fine count yarn, such that the volume of thick yarn is higher than the volume of fine count yarn, to produce a 2-ply yarn;

(c) weaving the 2-ply yarn to produce a fabric that is free of polyvinyl alcohol fibers;

(d) contacting the fabric with hot water to reduce the inner tension of the yarn; and (e) producing a low twist towel, wherein the thick yarn and the fine count yarn are cotton yarns.]

[2. The method of claim 1, wherein the thick yarn is a 16s-2s count yarn.]

[3. The method of claim 2, wherein the thick yarn is 12s count yarn.]

[4. The method of claim 1, wherein the fine count yarn is a greater than or equal to 60s count yarn.]

[5. The method of claim 4, wherein the fine count yarn is 60s count yarn.]

[6. The method of claim 1, wherein the thick yarn is 12s count yarn and the fine count yarn is 60s count yarn.]

[7. The method of claim 1, wherein the weight ratio of thick yarn to fine count yarn in step (a) is from about 3.5:1 to about 12:1.]

[8. The method of claim 7, wherein the weight ratio is 12:1.]

[9. The method of claim 1, wherein the volume ratio of thick yarn to fine count yarn in step (b) is from about 1.1:1 to about 1.3:1.]

[10. The method of claim 9, wherein the volume ratio is 1.2:1.]

[11. The method of claim 1, wherein step (d) comprises contacting the fabric for about 20-60 minutes with hot water having a temperature of about 80-95° C.]

[12. The method of claim 1, wherein step (d) comprises contacting the fabric for 60 minutes with hot water having a temperature of 85-92° C.]

[13. The method of claim 1, further comprising, after step (d), one or more steps selected from the group consisting of bleaching, dyeing, and final finishing.]

[14. The method of claim 13, wherein the method comprises a bleaching step comprising contacting the fabric with a solution comprising NaOH and a fine finishing agent.]

[15. The method of claim 14, wherein NaOH is present in a concentration of 5-15 g/L.]

[16. The method of claim 13, wherein the method comprises a final finishing step comprising contacting the fabric with a solution comprising a hydrophilic softener.]

[17. The method of claim 16, wherein the hydrophilic softener is selected from the group consisting of: crodamide ramification, 2.5-3.8% OWF; and cellulose, 0.8-1% OWF.]

*18. A low twist towel manufactured by a method that comprises the steps of: (a) Z twisting a thick yarn and separately Z twisting a fine count yarn; (b) unevenly S twisting the Z-twisted thick yarn into the Z-twisted fine count yarn, such that the volume of thick yarn is higher than the volume of fine count yarn, to produce at least a 2-ply yarn; (c) weaving the at least 2-ply yarn to produce a fabric; (d) contacting the fabric with hot water to reduce the inner tension of the at least*

*2-ply yarn; and (e) producing a low twist towel, wherein the thick yarn and the fine count yarn are cotton yarns, wherein the volume ratio of thick yarn to fine count yarn in step (b) is from about 1.1:1 to about 1.3:1.*

*19. The low twist towel of claim 18, wherein the volume ratio is 1.2:1.*

*20. The low twist towel of claim 32, wherein the weight ratio is 8:1.*

*21. A low twist towel manufactured by a method that comprises the steps of: (a) Z twisting a thick yarn and separately Z twisting a fine count yarn; (b) unevenly S twisting the Z-twisted thick yarn into the Z-twisted fine count yarn, such that the volume of thick yarn is higher than the volume of fine count yarn, to produce at least a 2-ply yarn; (c) weaving the at least 2-ply yarn to produce a fabric; (d) contacting the fabric with hot water to reduce the inner tension of the at least 2-ply yarn; and (e) producing a low twist towel, wherein the thick yarn and the fine count yarn are cotton yarns, and wherein the weight ratio of thick yarn to fine count yarn in step (a) is 12:1.*

*22. The low twist towel of claim 21, wherein the volume ratio of thick yarn to fine count yarn in step (b) is from about 1.1:1 to about 1.3:1.*

*23. The low twist towel of claim 22, wherein the volume ratio is 1.2:1.*

*24. A low twist towel manufactured by a method that comprises the steps of: (a) Z twisting a thick yarn and separately Z twisting a fine count yarn; (b) unevenly S twisting the Z-twisted thick yarn into the Z-twisted fine count yarn, such that the volume of thick yarn is higher than the volume of fine count yarn, to produce at least a 2-ply yarn; (c) weaving the at least 2-ply yarn to produce a fabric; (d) contacting the fabric with hot water to reduce the inner tension of the at least 2-ply yarn; and (e) producing a low twist towel, wherein the thick yarn and the fine count yarn are cotton yarns, and wherein the weight ratio of thick yarn to fine count yarn in step (a) is 8:1.*

*25. The low twist towel of claim 24, wherein the volume ratio of thick yarn to fine count yarn in step (b) is from about 1.1:1 to about 1.3:1.*

*26. The low twist towel of claim 25, wherein the volume ratio is 1.2:1.*

*27. The low twist towel of claim 18, wherein the thick yarn is a 16s-2s count yarn.*

*28. The low twist towel of claim 27, wherein the thick yarn is 12s count yarn.*

*29. The low twist towel of claim 18, wherein the fine count yarn is a greater than or equal to 60s count yarn.*

*30. The low twist towel of claim 29, wherein the fine count yarn is 60s count yarn.*

*31. The low twist towel of claim 18, wherein the thick yarn is 12s count yarn and the fine count yarn is 60s count yarn.*

*32. The low twist towel of claim 18, wherein the weight ratio of thick yarn to fine count yarn in step (a) is from about 3.5:1 to about 12:1.*

*33. The low twist towel of claim 32, wherein the weight ratio is 12:1.*

*34. The low twist towel of claim 18, wherein the volume ratio is 1.2:1.*

*35. The low twist towel of claim 18, wherein step (d) comprises contacting the fabric for about 20-60 minutes with hot water having a temperature of about 80-95° C.*

*36. The low twist towel of claim 18, wherein step (d) comprises contacting the fabric for 60 minutes with hot water having a temperature of 85-92° C.*

*37. The low twist towel of claim 18, further comprising, after step (d), one or more steps selected from the group consisting of bleaching, dyeing, and final finishing.*

*38. The low twist towel of claim 37, wherein the method comprises a bleaching step comprising contacting the fabric with a solution comprising NaOH and a fine finishing agent.*

*39. The low twist towel of claim 38, wherein NaOH is present in a concentration of 5-15 g/L.*

*40. The low twist towel of claim 37, wherein the method comprises a final finishing step comprising contacting the fabric with a solution comprising a hydrophilic softener.*

*41. The low twist towel of claim 40, wherein the hydrophilic softener comprises cellulose, 0.8-1% OWF.*

* * * * *